United States Patent
Ikeda et al.

(10) Patent No.: US 6,466,844 B1
(45) Date of Patent: Oct. 15, 2002

(54) ROBOT, ROBOT SYSTEM, AND ROBOT CONTROL METHOD

(75) Inventors: Tatsuya Ikeda, Kawanishi (JP); Hisatomi Fujiki, Toyonaka (JP); Akio Shindo, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/959,453
(22) PCT Filed: Mar. 1, 2001
(86) PCT No.: PCT/JP01/01594
§ 371 (c)(1), (2), (4) Date: Dec. 26, 2001
(87) PCT Pub. No.: WO01/67194
PCT Pub. Date: Sep. 13, 2001

(30) Foreign Application Priority Data

Mar. 6, 2000 (JP) .................................... 2000-060809

(51) Int. Cl.[7] .............................................. G06F 19/00
(52) U.S. Cl. .................. 700/245; 700/247; 700/257; 318/565; 318/568.14; 318/568.23; 901/1; 901/46; 901/47; 701/23
(58) Field of Search ............................... 700/245, 246, 700/247, 257, 264, 69, 64, 88; 318/565, 568.14, 568.16, 268.23, 590, 568.22, 568.18, 568.24, 458, 465, 488; 901/27, 43, 49, 46, 1; 701/23

(56) References Cited

U.S. PATENT DOCUMENTS

| | | | |
|---|---|---|---|
| 4,305,028 A | * 12/1981 | Kostas et al. | 318/565 |
| 4,360,886 A | * 11/1982 | Kostas et al. | 700/264 |
| 4,481,591 A | * 11/1984 | Spongh | 700/257 |
| 4,484,120 A | * 11/1984 | Olex et al. | 318/568.14 |
| 4,484,294 A | * 11/1984 | Noss | 700/257 |
| 4,523,135 A | * 6/1985 | Kogawa | 318/565 |
| 4,638,445 A | * 1/1987 | Mattaboni | 701/23 |
| 6,256,556 B1 | * 7/2001 | Zenke | 700/245 |

FOREIGN PATENT DOCUMENTS

| | | |
|---|---|---|
| JP | 05143611 | 6/1993 |
| JP | 07195285 | 8/1995 |
| JP | 08019985 | 1/1996 |

OTHER PUBLICATIONS

Kuka, Control cabinet, 1998, Internet, pp. 1–22.*
Kuka Roboter, System architectures for industrial robot controllers, 1998, Internet, pp. 1–8.*
Jones et al., A system for simulatin shared memory in heterogeneous distributed–memory networks with specializations for robotics applications, 1992, IEEE, pp. 2738–2744.*

* cited by examiner

Primary Examiner—William A. Cuchlinski, Jr.
Assistant Examiner—McDieunel Marc
(74) Attorney, Agent, or Firm—Stevens, Davis, Miller & Mosher, LLP (57) ABSTRACT

A robot for synchronizing with other robots without raising costs, a robot system, and a robot control method. The robot includes a storage portion (11) in which an operating program for the robot is stored, a main arithmetic portion (12) for analyzing the operating program stored in the storage portion, a sequencer portion (13) from which a signal from the main arithmetic portion is output, a driving portion (14) for driving the robot to which the signal from the main arithmetic portion (12) is input, and a communications portion (15) for communicating with apparatuses connected to a network. In the robot, a signal input from an apparatus connected to the sequencer portion (13) and a signal input to the communications portion (15) are input to the main arithmetic portion (12) so as to perform a calculation, and, based on the calculation, a signal is output from the main arithmetic portion (12) to the sequencer portion (13) or to the driving portion (14).

25 Claims, 9 Drawing Sheets

Example 1:Calculation method by main arithmetic portion:AND

| Sequencer portion input (robot-movement-permission-input) | Communications portion input (robot-moving command input) | Sequencer portion output (robot-driving output) |
|---|---|---|
| OFF | OFF | OFF |
| OFF | ON | OFF |
| ON | OFF | OFF |
| ON | ON | ON |

FIG. 2B

Example 2:Calculation method by main arithmetic portion:OR

| Sequencer portion input (robot-stopping input) | Communications portion input (robot-stopping command input) | Sequencer portion output (robot stop output) |
|---|---|---|
| OFF | OFF | OFF |
| OFF | ON | ON |
| ON | OFF | ON |
| ON | ON | ON |

Memory table

| Terminal number | Terminal attributes |
|---|---|
| 1-8<br>9-16<br>17-24<br>25-32 | Use of input/output for robot |
| 33-40<br>41-48<br>49-56<br>57-64 | Use of input/output for network |

ROBOT, ROBOT SYSTEM, AND ROBOT CONTROL METHOD

TECHNICAL FIELD

This invention relates to a robot, a robot system, and a robot control method in which a robot is connected to a network, and the functions of robot input/output, robot control, failure diagnosis, maintenance, etc., are performed via the network.

BACKGROUND ART

Conventionally, one or more industrial robots have been installed in a factory or in other similar buildings so as to perform the welding, conveyance, and assembly of components of products. In recent years, with the systematization and efficiency improvements in manufacturing environments such as that of a factory, cases have increased in which a medium-or large-scale production line is formed, and a plurality of industrial robots are installed as equipment for carrying out manufacture and inspection so as to construct a 24-hour operation of a mechanized production line in a manufacturing environment. In that case, as a robot-installing method, a method is employed in which the robot is installed in the vicinity of the production line of a belt conveyer, and is operated synchronously with the belt conveyer and with other equipment or is controlled synchronously with the operation of other robots and in a working condition.

In order to synchronize the robot with other robots or with a production line of a belt conveyer or the like, there has been employed a method of connecting a robot sequencer by which an input/output function of the robot is performed directly to input/output portions of the other robots or the conveyer, or a method of installing one or more controllers, such as programmable logic controllers, in the factory, thereafter connecting the input/output portions of the robots or the belt conveyer to the input/output portions of the controllers by means of lines, and allowing the controller to centrally control the equipment installed in the factory.

In the conventional technique, there is a need to physically connect the robot sequencer to the input/output portion of the equipment in the factory by means of lines, and, in order to connect a plurality of input/output terminals to each other, there is a need to connect the input/output portions by use of, for example, parallel cables that are made up of lines corresponding to the number of terminals. However, disadvantageously, if the number of pieces of equipment to be connected increases, the number of cables increases correspondingly, and, if the distance between pieces of equipment increases, that, of the cables increases correspondingly. Accordingly, a problem resides in that a space is required to dispose the cables in the factory, and the cost of preparation of the cables rises.

Further, in order to perform a logical operation for input/output information from one or more pieces of equipment and determine a command to control the one or more pieces of equipment on the basis of its result, a method is employed in which all the pieces of equipment are connected to a controller such as a programmable logic controller, and a logical operation is performed by the controller, and the result is output to the equipment to be controlled. Accordingly, a problem resides in that the cost of connection between the pieces of equipment goes up, or much time is consumed in programming the programmable logic controller.

Further, information exchanged between the input/output portions is only information for ON/OFF of input/output. Accordingly, a problem resides in that, when a large amount of data information is exchanged between the pieces of equipment of the production line or when information about the factors of errors caused by, for example, the breakdown of the equipment is exchanged between the pieces of equipment, a dedicated apparatus and a dedicated cable are required, and the installation cost rises.

DISCLOSURE OF INVENTION

It is an object of the present invention to provide a robot, a robot system, and a robot control method, which is capable of synchronizing with other robots, capable of performing a logical operation for input/output information, and capable of exchanging data information without raising costs.

As a method for solving the aforementioned problems, the function of connecting a robot to a network is realized. The term "network" mentioned here is to, as a method for connection between apparatuses of a production line, carry out data communications according to a predetermined communications method by use of information transmission cables for serial communications not by the use of parallel cables made up of a plurality of lines as mentioned above.

A robot according to a first aspect of the present invention comprises a storage portion in which an operating program for the robot is stored, a main arithmetic portion for analyzing the operating program stored in the storage portion, a sequencer portion from which a signal from the main arithmetic portion is output, a driving portion for driving the robot to which the signal from the main arithmetic portion is input, and a communications portion for communicating with apparatuses connected to a network, and is characterized in that a signal input from an apparatus connected to the sequencer portion to the sequencer portion and a signal input to the communications portion are input to the main arithmetic portion, and a calculation is performed by the main arithmetic portion, and, based on the calculation, a signal is output from the main arithmetic portion to the sequencer portion or to the driving portion.

According to the thus constructed robot, since the robot can be connected to the network, a signal (input information) transmitted from the network and a signal (input information) input from the sequencer portion are calculated, and, by determining the operations of the robot and the external apparatuses while reflecting its calculation result, the operations of the robot and the external apparatuses can be determined in accordance with the usage in the production line. Accordingly, the robot can work as an excellent industrial robot capable of synchronizing with other robots and the belt conveyer of the production line.

Further, since the robot can be connected to the network, communications can be carried out merely by joining only one information transmission cable to the robot even when a plurality of pieces of input/output information necessary to synchronize the robot with other apparatuses are exchanged with the apparatuses. Therefore, costs do not rise. Further, it becomes possible to transmit and receive not only ON/OFF information for input/output but also a large amount of data for an operating program of the robot and the error factor obtained when an error occurs through the network.

Further, in the thus constructed robot, the main arithmetic portion performs a calculation including "AND" and "OR" on the basis of a signal input from the apparatus connected to the sequencer portion to the sequencer portion and a signal input to the communications portion.

According to this structure, it is possible to construct a safer system or a production line in correspondence with actual usage in a factory.

A robot according to a second aspect of the present invention comprises a storage portion in which an operating program for the robot is stored, a main arithmetic portion for analyzing the operating program stored in the storage portion, a sequencer portion from which a signal from the main arithmetic portion is output, a driving portion for driving the robot to which the signal from the main arithmetic portion is input, and a communications portion for communicating with apparatuses connected to a network, and is characterized in that a message signal input from an apparatus connected to the sequencer portion to the sequencer portion and a message signal input to the communications portion are input to the main arithmetic portion, and a calculation is performed by the main arithmetic portion, so that a signal output from the main arithmetic portion to the sequencer portion or a signal output to the driving portion is controlled on the basis of the calculation.

According to the thus constructed robot, it is possible to set the most efficient operating speed or the highest-quality welding condition, and cause the robot to make various movements in correspondence with purposes, in addition to the same effect as that of the first aspect of the present invention.

A robot according to a third aspect of the present invention comprises a storage portion in which an operating program for the robot is stored, a main arithmetic portion for analyzing the operating program stored in the storage portion, a sequencer portion to which a signal from the main arithmetic portion is input, a driving portion for driving the robot to which the signal from the main arithmetic portion is input, a communications portion for communicating with apparatuses connected to a network, and a communications method storage portion in which information about the communications method of the network is stored, and is characterized in that communications are performed on the basis of the information stored in the communications method storage portion even in a network different in the communications method.

According to the thus constructed robot, the robot can be connected to any type of communications-method-network without exchanging the communications portion, in addition to the same effect as that of the first aspect of the present invention.

This robot is further provided with a plurality of input/output terminals, and is further provided with a memory table that stores the allotment of input/output terminals used for the input/output part of: the sequencer portion and input/output terminals used for the input/output part of the communications portion.

According to this structure, a user can inexpensively prepare the input/output terminal for a network and connect the robot to the network without newly adding input/output terminals for the network to a robot controller.

A robot according to a fourth aspect of the present invention comprises a storage portion in which an operating program for the robot is stored, a main arithmetic portion for analyzing the operating program stored in the storage portion, a sequencer portion to which a signal from the main arithmetic portion is input, a driving portion for driving the robot to which the signal from the main arithmetic portion is input, a communications portion for communicating with apparatuses connected to a network, and a history storage portion in which the history of the state of the robot is stored, and is characterized in that information about the history storage portion is output from the communications portion to the network when the stop factor of the robot occurs.

According to this structure, since the robot can be connected to the network, the robot can act as an excellent industrial robot capable of causing a management apparatus connected to the network to restore the production line into a correct working condition while[]using the history information by outputting the history of the state of the robot to the network even when the robot installed in the production line is stopped by some factor.

This robot is further provided with a plurality of input/output terminals, and is further provided with a memory table that stores the allotment of input/output terminals used for the input/output part of :the sequencer portion and input/output terminals used for the input/output part of the communications portion.

Further, a computer is used as the apparatus connected to the network, and communications are performed between at least two computers for information output from the history storage portion.

According to this structure, since the robot can be connected to the network, the robot can act as an excellent industrial robot capable of transmitting history information about the movement of the robot to a second computer installed at a remote location and obtaining information necessary for maintenance of the robot even in a remote location.

Further, a computer is used as the apparatus connected to the network, and communications are performed between at least two computers for all of or part of the operating program of the robot, thus storing the operating program of the robot in the storage portion through the communications portion from one of the computers.

According to this structure, since the robot can be connected to the network, the robot-operating program rewritten by the manufacturer of the robot can be stored in the storage portion of the robot that has had a breakdown, and the robot can move according to an appropriate operating program. Accordingly, it is possible to realize an excellent industrial robot whose maintenance can be carried out by the manufacturer of the robot from a remote location.

Further, each of the two computers is provided with an encrypting means for encrypting information to be communicated and a decrypting means for restoring encrypted information into its original condition.

According to this structure, the history information or the operating program of the robot is encrypted, and thereby information can be prevented from leaking out to a third person.

Further, the present invention uses a plurality of robots, an operating means connected to at least one of the robots, a communications portion from which a signal for driving the robot connected to the operating means is output, and a computer used as the apparatus connected to the network, and is characterized in that a signal is input from the computer to a second robot different from the robot that has output the robot driving signal through the. communications portion, and the second robot is driven according to information operated by the operating means.

According to this structure, a user can easily understand the method of operating the robot, and can safely teach the operating method.

Further, in the present invention, there is provided a discrimination means from which a discrimination sign is output to each of the apparatuses connected to the network.

According to this structure, it becomes possible to discriminate information transmitted and received to and from the network, and determine its priority.

A robot control method according to a fifth aspect of the invention comprises a step for storing an operating program of a robot, a step for analyzing a stored operating program, a step for outputting a robot-driving signal in accordance with an analyzed operating program, a step for outputting a signal from an apparatus connected to a network, a step for inputting a signal from an apparatus connected to a sequencer portion, a step for calculating an input signal, and a step for controlling an output of the driving signal on the basis of the calculation.

According to this structures, the movement of an external apparatus can be determined in accordance with the purpose in a production line.

Further, a calculation that includes "AND" and "OR" is performed when the input signal is calculated.

According to this structure, a safer system can be constructed, and a production line corresponding to actual use in the factory can be constructed.

A robot control method according to a sixth aspect of the invention comprises a step for storing an operating program of a robot, a step for analyzing a stored operating program, a step for outputting a robot-driving signal in accordance with an analyzed operating program, a step for inputting a message signal from an apparatus connected to a network, a step for inputting a message signal from an apparatus connected to a sequencer portion, a step for calculating an input message signal, and a step for controlling an output of a signal to be output to the sequencer portion or an output of the robot-driving signal on the basis of the calculation.

According to the thus constructed robot control method, the movement of an external apparatus can be determined in accordance with the purpose in the production line.

A robot control method according to a seventh aspect of the present invention comprises a step for storing an operating program of a robot, a step for analyzing a stored operating program, a step for outputting a robot-driving signal in accordance with an analyzed operating program, a step for storing a history of the state of the robot, and a step for outputting the stored history information to the network when a stop factor of the robot occurs.

According to this structure, since the history of the state of the robot is output to the network, a management apparatus connected to the network can use the history information and restore the production line into a correct working condition even when the robot installed in the production line stops by some factor.

MODES FOR CARRYING OUT THE INVENTION (Embodiment 1)

Figure 1:
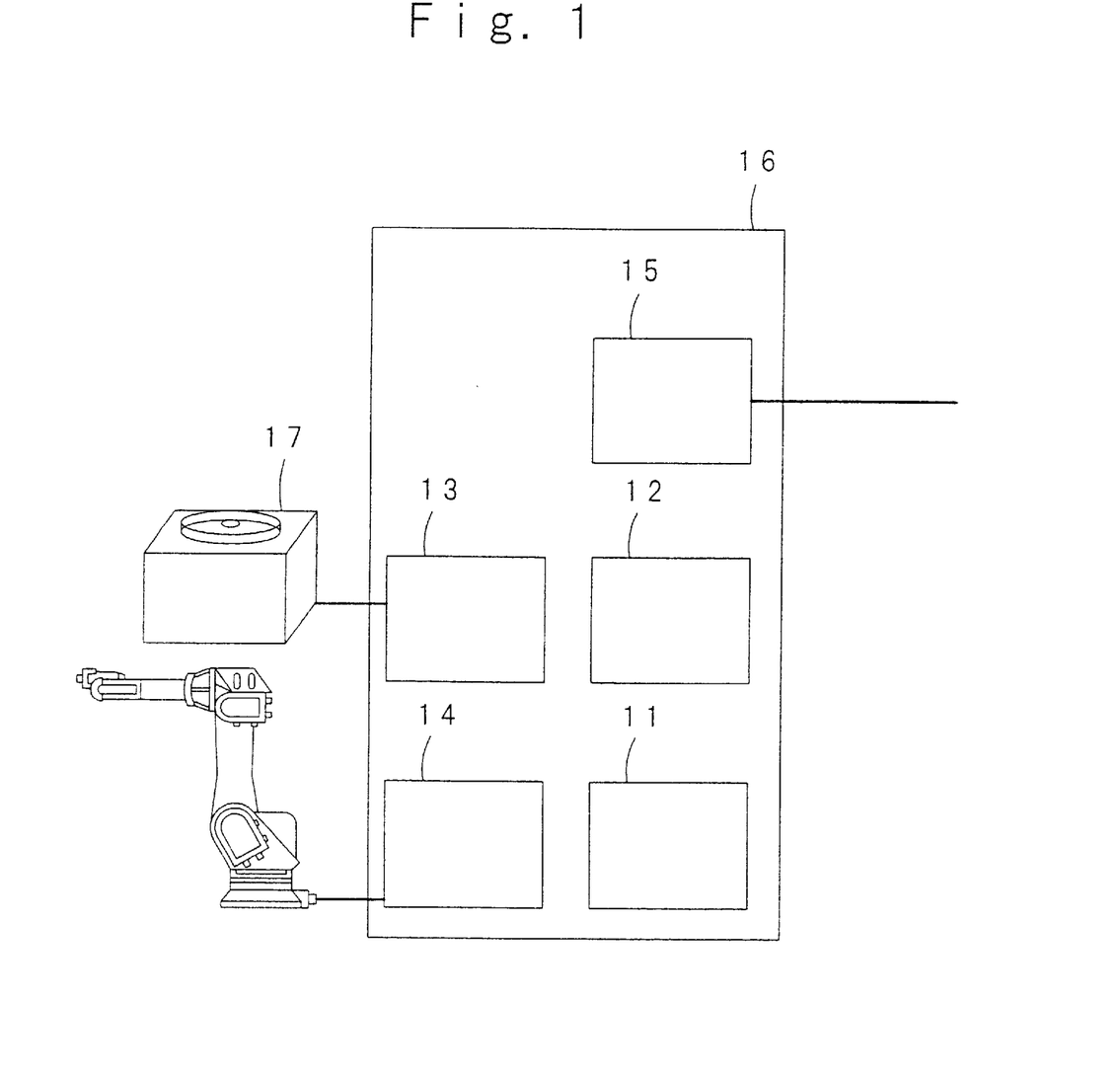
FIG. 1 is an explanatory drawing for explaining a first embodiment that includes the basic structure of an industrial robot that realizes the present invention.

A first embodiment of the present invention will be described with reference to FIG. 1. FIG. 1 shows the basic structure of an industrial robot that realizes the first embodiment of the present invention. In FIG. 1, reference numeral 11 designates a storage portion in which an operating program of the robot is stored, reference numeral 12 designates a main arithmetic portion by which the operating program stored in the storage portion 11 is analyzed, reference numeral 13 designates a sequencer portion for outputting a signal from the main arithmetic portion 12 and informing the main arithmetic portion 12 about an input from an external apparatus 17, reference numeral 14 designates a driving portion for driving the robot on the basis of a signal from the main arithmetic portion 12, and reference numeral 15 designates a communications portion for communicating with an apparatus connected to a network. Reference numeral 16 designates a controller that includes the storage portion 11, the main arithmetic portion 12, the sequencer portion 13, the driving portion 14, and the communications portion 15.

If a control signal is transmitted to the robot from the network in order to operate the external apparatus 17 when the external apparatus 17 is connected to the sequencer portion 13 as shown in FIG. 1, the control signal is sent to the main arithmetic portion 12 through the communications portion 15. The control signal is then analyzed by the main arithmetic portion, thereafter is converted into a signal to operate the external apparatus 17, and is transmitted to the sequencer portion 13. Thereafter, the sequencer portion 13 operates the external apparatus 17 on the basis of the signal transmitted from the main arithmetic portion 12.

On the other hand, if a signal to forbid the operation of the external apparatus 17 is input from the sequencer portion 13, this signal is transmitted to the main arithmetic portion 12. At this time, the signal to control the external apparatus 17, which has been previously transmitted from the network, and the signal to forbid the operation of the external apparatus 17, which has been input from the sequencer portion 13, are calculated by the main arithmetic portion 12, and the movement of the external apparatus 17 is determined from the calculation result. Thus, it is possible to obtain the effect of being able to determine the movement of the external apparatus 17 in accordance with the purpose in the production line.

(Embodiment 2)

Figure 2A:
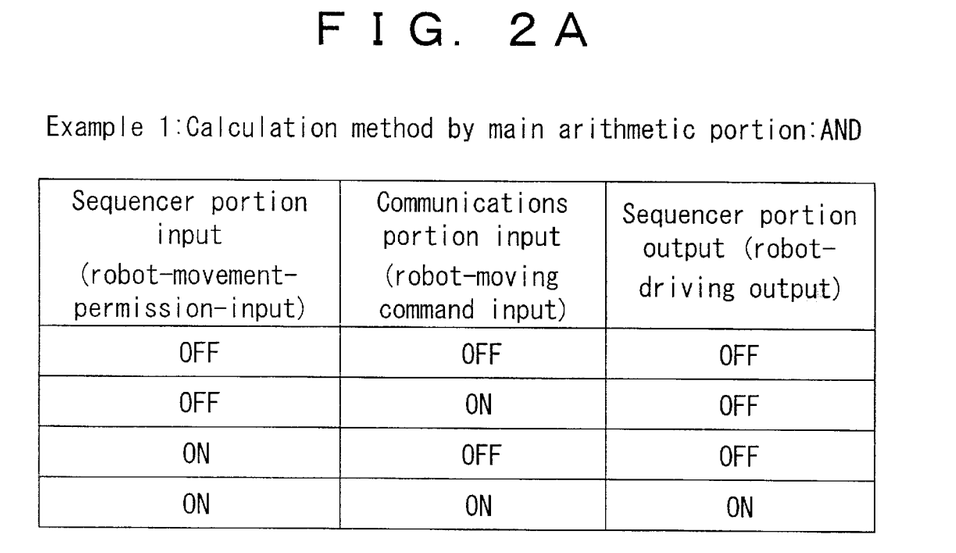
FIG. 2 is an explanatory drawing for explaining a second embodiment.
Figure 2B:
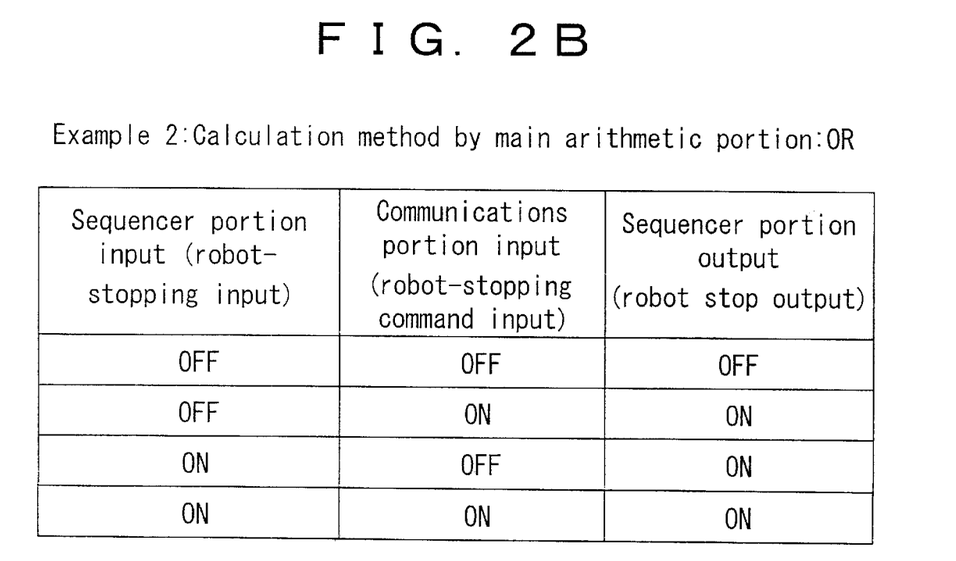

A second embodiment of the present invention will be described with reference to FIG. 2. Example 1 of (a) of FIG. 2 shows that a calculation method used in the main arithmetic portion 12 of the first embodiment is an AND operation. Even when a robot-moving command is transmitted from the network to the robot as an ON-signal through the communications portion 15, robot-driving output is turned on by the robot-moving command from the network only when robot-movement-permission-input is given as an ON-signal by the sequencer portion 13. The robot-movement-permission-input given by the sequencer portion 13 may be given by an operator or may be given by other external apparatuses connected to the robot.

When the operator must temporarily enter the working space of the robot for some reason, all that is needed is to turn the robot-movement-permission-input off. If so, the robot-driving output is not turned on even if a robot-moving command is sent from the network, and the robot does not work. Therefore, the present invention has the effect of enabling the operator to safely work.

Further, when a belt conveyer, for example, is used as the external apparatus 17 connected to the robot, and when the robot operates to the work on the belt conveyer, the robot-movement-permission-input is turned off, and the robot-moving command from the network is invalidated if a sensor installed in the belt conveyer judges that the work position is abnormal. Therefore, the present invention has the effect of being able to prevent a malfunction in which operations are performed for work in an abnormal position.

Example 2 of (b) of FIG. 2 shows that the calculation method used in the main arithmetic portion 12 is an OR operation. When either a robot-stopping command from the network or robot-stopping-input given by the sequencer portion 13 is turned on or when both of them are turned on, the robot-driving output is turned off. The robot-stopping-input given by the sequencer portion 13 may be given by the operator, or may be given by other external apparatuses connected to the robot.

When the operator wants to stop the robot for some reason, or when the controller that manages the entire production line stops the robot because of an abnormality of other apparatuses, either of the stopping commands is turned on to stop the robot.

As mentioned above, the robot inputs a signal that has been input from the external apparatus 17 connected to the sequencer portion 13 to the sequencer portion 13 and a signal that has been input to the communications portion 15 to the main arithmetic portion 12, thereafter performs the AND operation or the OR operation in the main arithmetic portion 12, and outputs a signal from the main arithmetic portion 12 to the sequencer portion 13 or to the driving portion 34 on the basis of the calculation. Therefore, the robot has the effect of being able to construct a safer system, and has the effect of being able to construct a production line corresponding to actual use in the factory.

(Embodiment 3)

A third embodiment of the present invention will be described with reference to FIG. 1. In this embodiment, a message transmitted from the network to the robot is a robot-moving command message, and, on the other hand, a message input by the sequencer portion 13 of the robot is the operation speed of the robot. A movement command message from the network is sent to the main arithmetic portion 12 through the communications portion 15, and the contents of the message data are analyzed by the main arithmetic portion 12. On the other hand, an operation speed message input by the sequencer portion 13 is also sent to the main arithmetic portion 12. At this time, the movement command message from the network and the operation speed message from the sequencer portion 13 are calculated by the main arithmetic portion 12, and the robot moves at a speed input by the sequencer portion 13 when a robot-moving command is transmitted from the network.

The movement of the robot is controlled by a control command transmitted to the robot by means of a controller disposed on the network that manages the production line. On the other hand, the operation speed of the robot may be set by the operator, or may be input by an external shaft connected to the robot. If the operator inputs the operation speed of the robot, the speed can be set in accordance with the working condition of the robot. Therefore, the present invention has the effect of enabling the operator to input the most efficient operating speed in the nearest to the robot.

If an external apparatus connected to the robot sets the operation speed of the robot, a sensor, for example, connected to the robot detects the working condition of the robot, and the operation speed of the robot can be set in accordance with the condition. Therefore, the present invention has the effect of enabling the external apparatus connected to the robot to set the most efficient operating speed without depending on a command of the controller disposed on the network.

Next, a case will be shown in which a message transmitted from the network to the robot is a welding command message of the robot, and, on the other hand, a message input by the robot sequencer 13 is a welding condition message of the robot. The welding command message from the network is sent to the main arithmetic portion 12 through the communications portion 15, and the contents of the message data are analyzed by the main arithmetic portion 12. On the other hand, the welding condition message input by the sequencer portion 13 is also sent to the main arithmetic portion 12. At this time, the welding command message from the network and the welding condition message from the sequencer portion are calculated by the main arithmetic portion 12, and the robot performs a welding operation under a welding condition input by the sequencer portion 13 when a welding command is transmitted from the network.

If the operator inputs the welding condition of the robot, the welding condition can be set in accordance with a finish made by the welding operation of the robot. Therefore, the present invention has the effect of enabling the operator to input the highest-quality welding condition in the nearest to the robot.

If the external apparatus 17 connected to the robot sets the welding condition of the robot, a sensor, for example, connected to the robot detects a finish made by the welding operation of the robot, and the welding condition of the robot can be set in accordance with the finish. Therefore, the present invention has the effect of enabling the external apparatus 17 connected to the robot to set a welding condition highest in quality.

As mentioned above, the robot inputs a message signal that has been input from the apparatus connected to the sequencer portion 13 to the sequencer portion 13 and a message signal that has been input to the communications portion 15 to the main arithmetic portion 12, thereafter performs a calculation in the main arithmetic portion 12, and controls a signal output from the main arithmetic portion 12 to the sequencer portion 13 on the basis of the calculation. In this robot, not only ON/OFF data of input/output but also messages can be calculated. Therefore, the present invention has the effect of enabling the robot to perform various movements corresponding to actual use in the factory. The message from the network and the message input from the sequencer portion 13 bring about a similar effect not only in the above-mentioned case but also in other movement commands or parameters.

(Embodiment 4)

A fourth embodiment of the present invention will be described with reference to FIG. 3. Although the robot can be connected to the network in the present invention, a communications method, such as a communications protocol, largely depends on the system of a production line or a user. In this case, a method of exchanging a communications portion in accordance with the communications method of the network has been employed. However, according to this method, much time is consumed in the exchange, and exchange costs are entailed.

Therefore, the present invention includes a communications method storage portion in which information about the communications method of the network is stored, by which communications can be performed on the basis of the information stored in the communications method storage portion even in a network having a different communications method.

Figure 3:
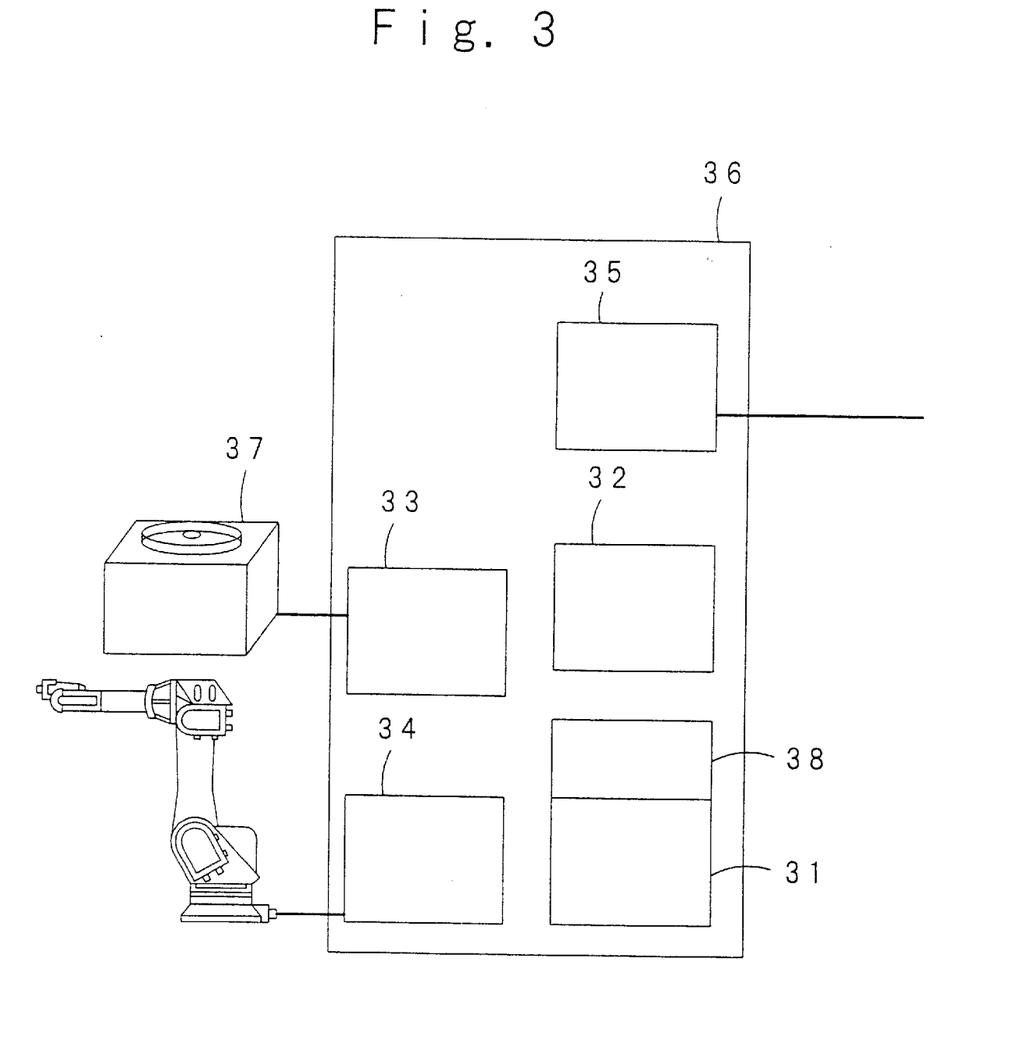
FIG. 3 is an explanatory drawing for explaining a fourth embodiment.

FIG. 3 shows the structure of an industrial robot that realizes the present invention. In FIG. 3, reference numeral 31 designates a storage portion in which an operating program of the robot is stored, reference numeral 32 designates a main arithmetic portion by which the operating program stored in the storage portion 31 is analyzed, reference numeral 33 designates a sequencer portion for outputting a signal from the main arithmetic portion 32 and informing the main arithmetic portion 32 about an input from an external apparatus 37, reference numeral 34 designates a driving portion for driving the robot on the basis of a signal from the main arithmetic portion 32, reference numeral 35 designates a communications portion for communicating with an apparatus connected to a network, and reference numeral 38 designates a communications method storage portion in which information about the communications method of the network is stored. Reference numeral 36 designates a controller that includes the storage portion 31, the main arithmetic portion 32, the sequencer portion 33, the driving portion 34, the communications portion 35, and the communications method storage portion 38.

Let us assume that a communications method "A" is being used in a certain factory. An operator sets the communications method "A" by means of an operation panel of the robot when the robot is connected to the network. At this time, the communications protocol and the communications speed of the communications method "A" are prestored in the communications method storage portion 38, and the communications portion 35 performs a communications function with the network in accordance with information about the communications method "A" stored in the communications method storage portion 38. Likewise, when the operator sets a communications method "B", the communications portion 35 performs a communications function with the network in accordance with information about the communications method "B" stored in the communications method storage portion 38.

The communications method storage portion 38 can store a plurality of communications methods, and the operator can select a plurality of communications methods corresponding to a condition of the production line of the factory.

The present invention provides the communications method storage portion 38 in which communications methods are stored, and, accordingly, has the effect of being able to connect the robot to any type of communications-method-network without exchanging the communications portion 35 even in a network having a different communications method.

(Embodiment 5)

Figure 4:
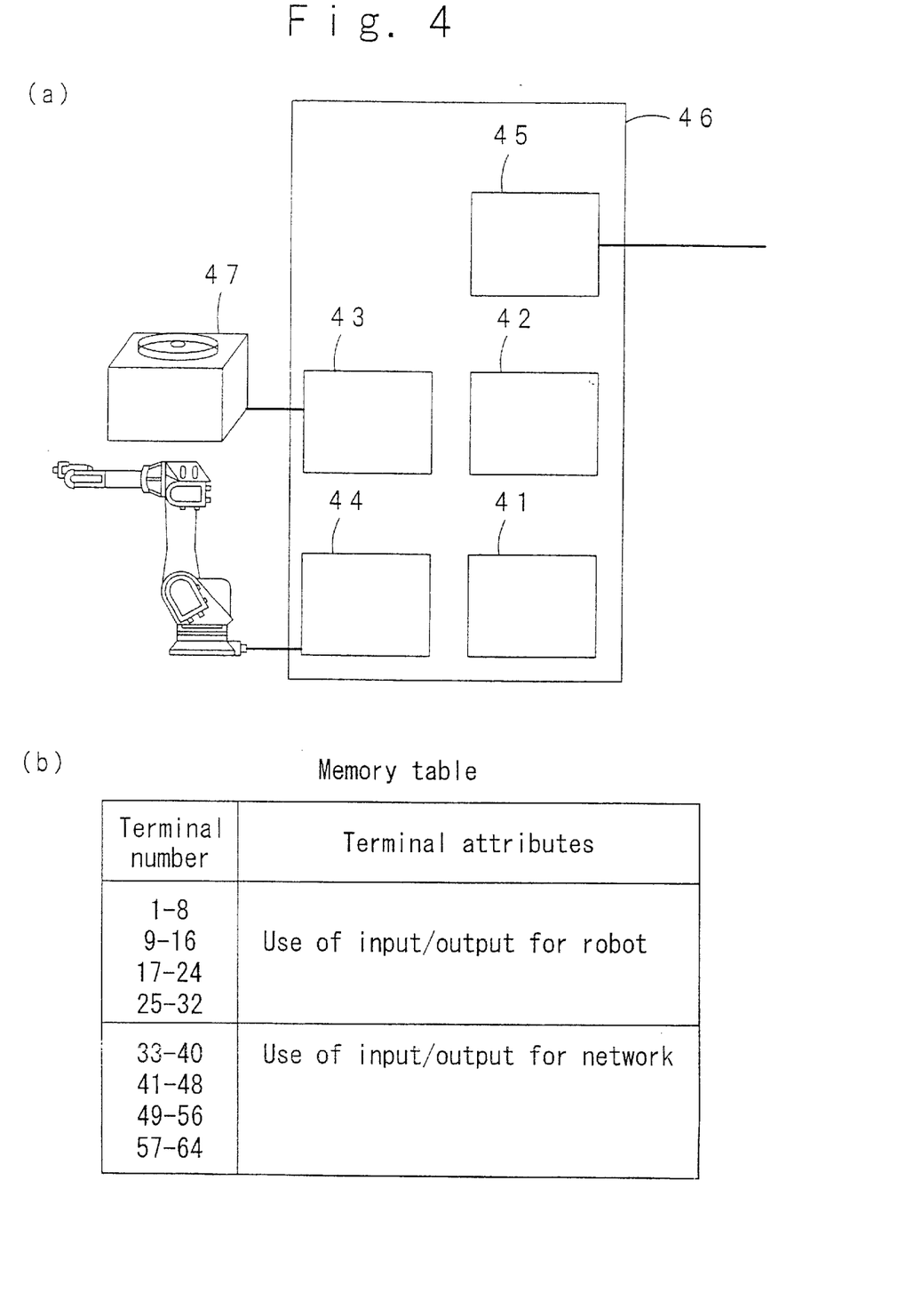
FIG. 4 is an explanatory drawing for explaining a fifth embodiment, in which (a) is an explanatory drawing of the whole thereof, and (b) is an explanatory drawing of a memory table.

A fifth embodiment of the present invention will be described with reference to FIG. 4. (a) of FIG. 4 shows the structure of an industrial robot that realizes the present invention. In (a) of FIG. 4, reference numeral 41 designates a storage portion in which an operating program of the robot is stored, reference numeral 42 designates a main arithmetic portion by which the operating program stored in the storage portion 41 is analyzed, reference numeral 43 designates a sequencer portion for outputting a signal from the main arithmetic portion 42 and informing the main arithmetic portion 42 about an input from an external apparatus 47, reference numeral 44 designates a driving portion for driving the robot on the basis of a signal from the main arithmetic portion 42, reference numeral 45 designates a communications portion for communicating with an apparatus connected to a network, and reference numeral 47 designates an external apparatus controlled by the input/output of the sequencer portion 43. Reference numeral 46 designates a controller that includes the storage portion 41, the main arithmetic portion 42, the sequencer portion 43, the driving portion 44, and the communications portion 45. This structure is the same as each of the first through fourth embodiments, and the fifth embodiment is applicable to each of them.

If the robot is not connected to the network, all input/output terminals of the robot sequencer 43 are used for the input/output processing of the robot when the robot moves on the basis of the operating program stored in the storage portion 41.

On the other hand, if the robot is connected to the network, an input/output command from the network is sent to the sequencer portion 43 via the communications portion 45 when the sequencer portion 43 is directly informed about the input/output command from the network. In this case,. in the conventional technique, there has been a need to prepare a sequencer portion for the network and add it to the controller of the robot.

The addition of the sequencer portion for the network to the robot controller entails new cost, which are imposed on a user.

In the present invention, a memory table that stores the allotment of an input/output terminal used for the input/output part of the robot sequencer 43 and an input/output terminal used for the input/output part of the communications portion 45 is provided in the storage portion 41, and input/output is performed in accordance with the memory table.

In the memory table of FIG. 4(b), the 1st through 32nd input/output terminals are, respectively, used as input/output terminals for the robot, and the 33rd through 64th input/output terminals are, respectively, used as input/output terminals for the network. In this memory table, the operator can set an arbitrary allotment by means of the operation panel of the robot controller, and the allotment that has been set is stored in the storage portion 41 as a memory table.

As mentioned above, the present invention provides a plurality of input/output terminals, and provides the memory table that stores the allotment of the input/output terminal used for the input/output part of the sequencer portion 43 and the input/output terminal used for the input/output part of the communications portion 45. Therefore, the present invention has the effect of being able to prepare the input/output terminal for the network without newly adding input/output terminals for the network to the robot controller and the effect of enabling the user to inexpensively connect the robot to the network.

(Embodiment 6)

Figure 5:
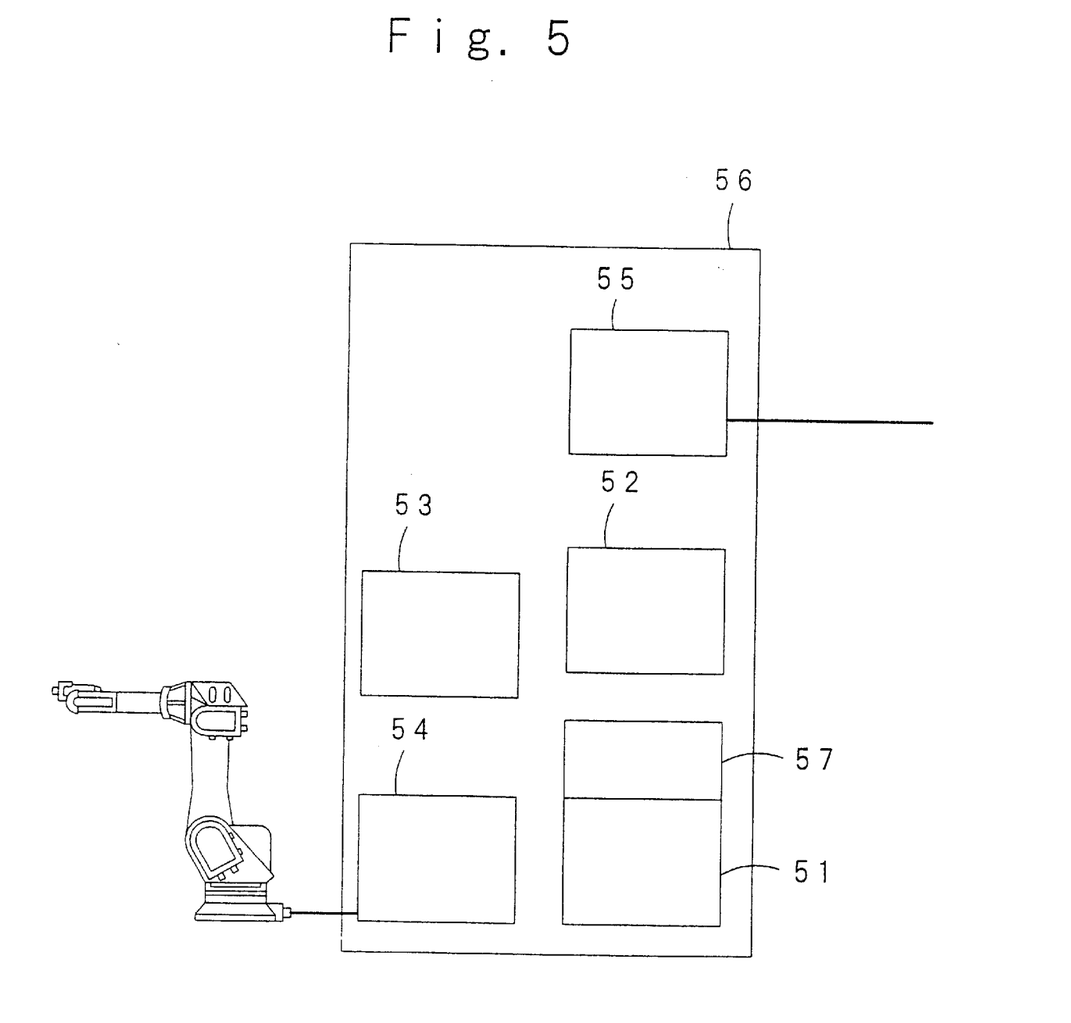
FIG. 5 is an explanatory drawing for explaining a sixth embodiment.

A sixth embodiment of the present invention will be described with reference to FIG. 5. FIG. 5 shows the structure of an industrial robot that realizes the present invention. In FIG. 5, reference numeral 51 designates a storage portion in which an operating program of the robot is stored, reference numeral 52 designates a main arithmetic portion by which the operating program stored in the storage portion 51 is analyzed, reference numeral 53 designates a sequencer portion for outputting a signal from the main arithmetic portion 52 and informing the main arithmetic portion 52 about an input from an external apparatus, reference numeral 54 designates a driving portion for driving the robot on the basis of a signal from the main arithmetic portion 52, reference numeral 55 designates a communications portion for communicating with an apparatus connected to a network, and reference numeral 57 designates a history storage portion in which the history of a robot state is stored. Reference numeral 56 designates a controller that includes these elements.

The robot is operated while recording information about which step of the operating program is being executed, about how the operator has operated, or about the state of the input/output in the history storage portion 57 for the past several minutes when the industrial robot installed in the production line is working. Further, when the robot stops for some cause, the stop factor is recorded in the history storage portion 57.

As method 1 of outputting the information stored in the history storage portion 57 to the network when the robot stops, there is a method of allowing the robot to automatically output the history information stored in the history storage portion 57 to the network via the communications portion 55. Further, as method 2, there is a method in which an information-requesting command is issued from the network to the robot after the robot stops, and the robot responds to this command and outputs the history information stored in the history storage portion 57 to the network via the communications portion 55.

The robot movement history information that has been output to the network is transmitted to the management apparatus of the production line connected to the network, and the factor that has caused the stop of the robot or the robot movement history is analyzed so as to take appropriate action for the stopped robot and the entire production line. Therefore, the production line can be restored into a correct working condition.

As mentioned above, in the present invention, the history storage portion 57 in which the history of the state of the robot is stored is provided, and the robot outputs information stored in the history storage portion 57 from the communications portion 55 to the network when the stop factor of the robot occurs. Accordingly, the history of the state of the robot is output to the network even when the robot installed in the production line stops for some reason, and, advantageously, the management apparatus connected to the network can restore the production line into a correct working condition by use of this history information.

(Embodiment 7)

A seventh embodiment of the present invention will be described with reference to FIG. 5. In this embodiment, the history storage portion 57 mentioned in the sixth embodiment in which the history of the state of the robot is stored is provided, and the robot outputs information stored in the history storage portion 57 from the communications portion 55 to the network when the stop factor of the robot occurs. The robot further includes the memory table mentioned in the fifth embodiment that stores the allotment of the input/output terminal used for the input/output part of the robot sequencer 43 and the input/output terminal used for the input/output part of the communications portion 45 in the storage portion 51. This robot has the same effect as in the sixth embodiment.

(Embodiment 8)

Figure 6:
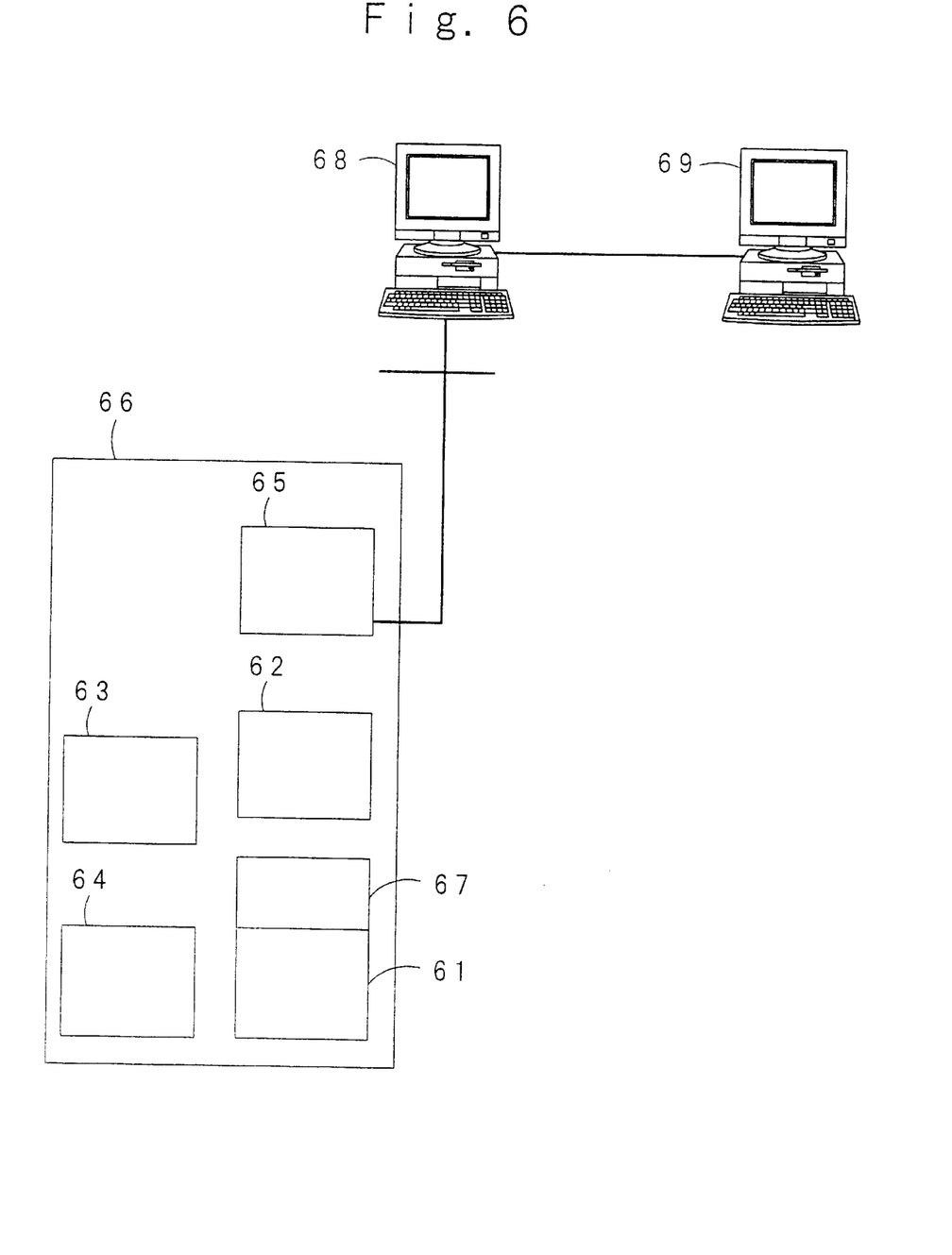
FIG. 6 is an explanatory drawing for explaining an eighth embodiment.

An eighth embodiment of the present invention will be described with reference to FIG. 6. FIG. 6 shows the structure of an industrial robot that realizes the present invention. In FIG. 6, reference numeral 61 designates a storage portion in which an operating program of the robot is stored, reference numeral 62 designates a main arithmetic portion by which the operating program stored in the storage portion 61 is analyzed, reference numeral 63 designates a sequencer portion for outputting a signal from the main arithmetic portion 62 and informing the main arithmetic portion 62 about an input from an external apparatus, reference numeral 64 designates a driving portion for driving the robot on the basis of a signal from the main arithmetic portion 62, reference numeral 65 designates a communications portion for communicating with an apparatus connected to a network, reference numeral 67 designates a history storage portion in which the history of a robot state is stored, and reference numeral 66 designates a controller that includes these elements. Reference numeral 68 designates a first computer connected to the network, and reference numeral 69 designates a second computer that is connected to the first computer 68 and that can communicate with the first computer 68.

In the robot of the sixth embodiment and in the robot of the seventh embodiment, the history information regarding the robot state is output to the network through the communications portion 65 of the robot when the robot stops for some cause. The history information of the robot output to the network is transmitted to the first computer 68 that functions as a management apparatus of the production line. The first computer 68 that has received the history information of the robot from the network can restore the production line into a correct working condition by use of this history information.

Herein, it is also possible to transmit the history information of the state of the robot to the second computer 69 different from the first computer 68. For example, if the stop factor of the robot is a breakdown of the robot, the history information that can analyze the cause leading to the breakdown is transmitted via the network to the first computer 68 installed in the same factory as the robot is set. Thereafter, the first computer 68 is connected to the second computer 69 installed in the manufacturer of the robot via a telecommunications line, and the history information obtained when the robot breakdown occurs is transmitted to the second computer 69 through the telecommunications line. The history information that has been obtained when the robot breakdown occurs and has been transmitted to the second computer 69 is analyzed by the manufacturer of the robot, and thereby the cause of why the breakdown occurred can be specified.

As mentioned above, the present invention realizes a robot system in which communications are performed between at least the two computers 68 and 69 about information output from the history storage portion 67 by use of the computers 68 and 69 serving as the apparatus connected to the network. Therefore, the present invention has the effect of being able to transmit the movement history information regarding the state of the robot to the second computer 69 installed at the remote location and being able to obtain information necessary for maintaining the robot even if it is at a remote location.

(Embodiment 9)

A ninth embodiment of the present invention will be described with reference to FIG. 6. In the eighth embodiment, if the stop factor of the robot is, for example, the breakdown of the robot, the movement history information about the robot is transmitted to the first computer 68 connected to the network, and is transmitted to the second computer 69 connected to the first computer 68 so as to analyze the history information obtained when the breakdown of the robot occurred. Thereby, the cause of why the breakdown occurred can be specified. If the second computer 69 is installed at the manufacturer of the robot, the manufacturer corrects the operating program of the robot from the specified cause of the breakdown of the robot. The corrected operating program is transmitted from the second computer 69 to the first computer 68, and the first computer 68 outputs this operating program to the network, and the operating program is stored in the storage portion 61 of the robot via the communications portion 65.

As mentioned above, the present invention realizes a robot system in which the computers 68 and 69 are used as the apparatus connected to the network, and communications are performed between at least the two computers 68 and 69 for the whole of or apart of the operating program of the robot, and the operating program of the robot is stored in the storage portion 61 via the communications portion 65 from either the computer 68 or the computer 69. Accordingly, since communications are performed between the two computers 68 and 69 for the operating program of the robot that has been corrected by the manufacturer, the corrected program is stored in the storage portion 61 of the robot that has caused the breakdown. Therefore, the present invention has the effect of being able to operate the robot according to an appropriate operating program, and being able to allow the manufacturer to maintain the robot at a remote location.

(Embodiment 10)

Figure 7:
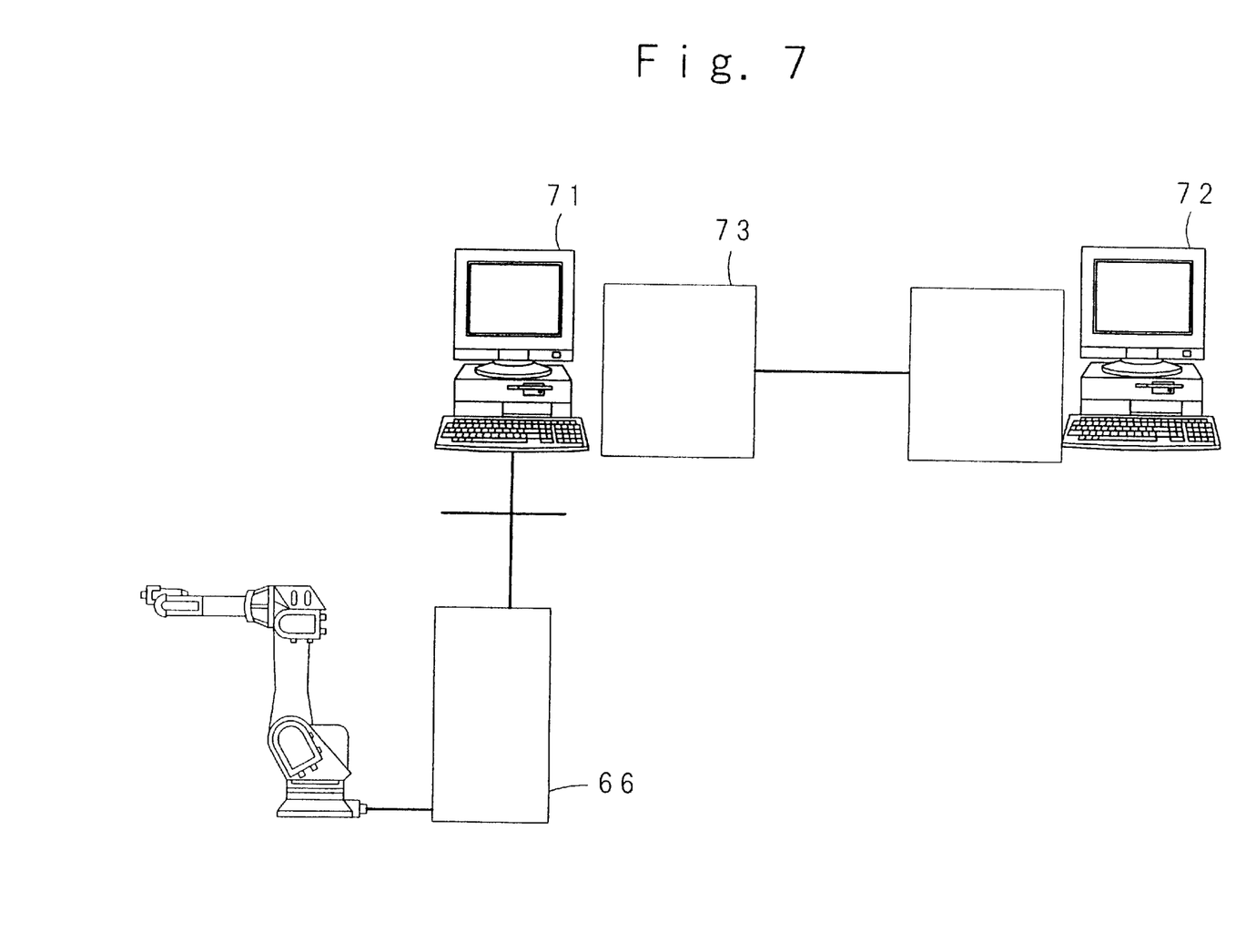
FIG. 7 is an explanatory drawing for explaining a tenth embodiment.

A tenth embodiment of the present invention will be described with reference to FIG. 7. FIG. 7 shows the structure of an industrial robot that realizes the present invention. In FIG. 7, reference numeral 71 designates a first computer connected to a network, reference numeral 72 designates a second computer that is connected to the first computer 71 and that can communicate with the first computer 71, and reference numeral 73 designates an encryption/decryption means for encrypting information, which is given as software in the first or second computer 71 or 72 and which is output from the first or second computer 71 or 72, and for decrypting the encrypted information that is being transmitted from the first or second computer 71 or 72. A controller 66 is the same as that of, for example, FIG. 6, and this embodiment is applicable to the eighth embodiment or to the ninth embodiment.

When history information regarding a robot movement or the operating program of the robot is transmitted and received between at least the two computers 71 and 72, data is output to the encryption/decryption means 73, and the encryption/decryption means 73 encrypts the input data. At this time, the encrypting means uses a common-key cryptosystem or a public-key cryptosystem that is employed as an encrypting means on the Internet. The encrypted state is transmitted to the computer of the other party through the telecommunications line, is then decrypted by the encryption/decryption means 73, and is output to the computer.

As mentioned above, the present invention realizes a robot system in which the encrypting means for encrypting information to be communicated and the decrypting means for restoring encrypted information into an original state are provided in the two computers 71 and 72. Therefore, the present invention has the effect of being able to prevent information from leaking out to a third party as a result of the encryption of the history information or the operating program of the robot.

(Embodiment 11)

Figure 8:
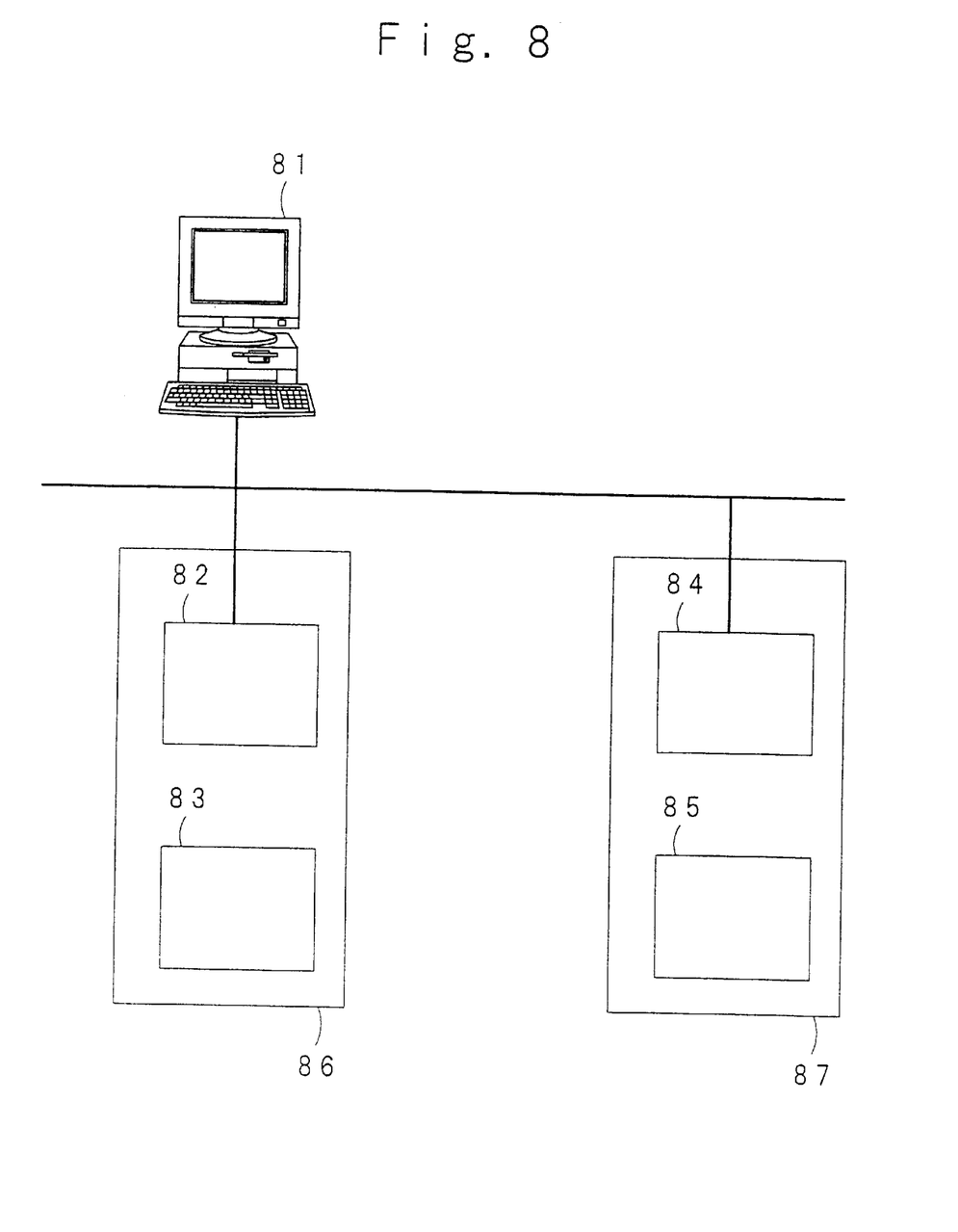
FIG. 8 is an explanatory drawing for explaining an eleventh embodiment.

An eleventh embodiment of the present invention will be described with reference to FIG. 8. FIG. 8 shows the structure of an industrial robot that realizes the present invention. In FIG. 8, reference numeral 81 designates a computer connected to a network, reference numeral 86 designates a first controller, reference numeral 82 designates a communications portion disposed in the first controller 86 for communicating with an apparatus connected to the network, reference numeral 83 designates an operating means for operating the robot, reference numeral 87 designates a second controller, reference numeral 84 designates a communications portion disposed in the second controller 87 for communicating:with an apparatus connected to the network, and reference numeral 85 designates an operating means for operating the robot.

When the operator uses the operating means 83 and operates the robot, a signal to drive thee robot is also output to the communications portion 82, and is further transmitted to the first computer 81 connected to the network. The first computer 81 transmits the signal to the second controller 87 connected to the network, and the signal is used as a robot-driving signal to drive the robot via the communications portion 84. At this time, operations for the operator to operate the robot while using the operating means 83 of the first controller 86 is transmitted to the second controller 87 via the network without changing the operations, and the robot connected to the first controller 86 and the robot connected to the second controller 87 perform exactly the same movement.

As mentioned above, the present invention realizes a robot system in which a signal is input via the communications portion 84 from the computer 81 to the second robot different from the robot that outputs the robot-driving signal, and the second robot is driven according to information operated by the operating means 85, using the operating means 83 and 85 connected to the robot, the communications portions 82 and 84 connected to the operating means 83 and 85 for outputting a signal to drive the robot, and the computer 81 as an apparatus connected to the network. Accordingly, the two robots can be caused to perform exactly the same movement. For example, in a case in which a service engineer who fully knows the robot-operating method teaches the operating method to a user inexperienced in operating the robot, when the service engineer uses the operating means and operates the robot installed in front of the service engineer, the robot installed in front of the user also performs the same movement, thus making it easy for the user to understand the robot-operating method. Further, as an applied usage, a system is realized in which the service engineer operates the robot with the operating means 83 according to the method of the first embodiment, and, at the same time, the user operates the robot with the operating means 85, and the robot works for the first time when the two operations completely coincide with each other. Therefore, the present invention has the effect of being able to teach the robot-operating method to the user more safely.

(Embodiment 12)

Figure 9:
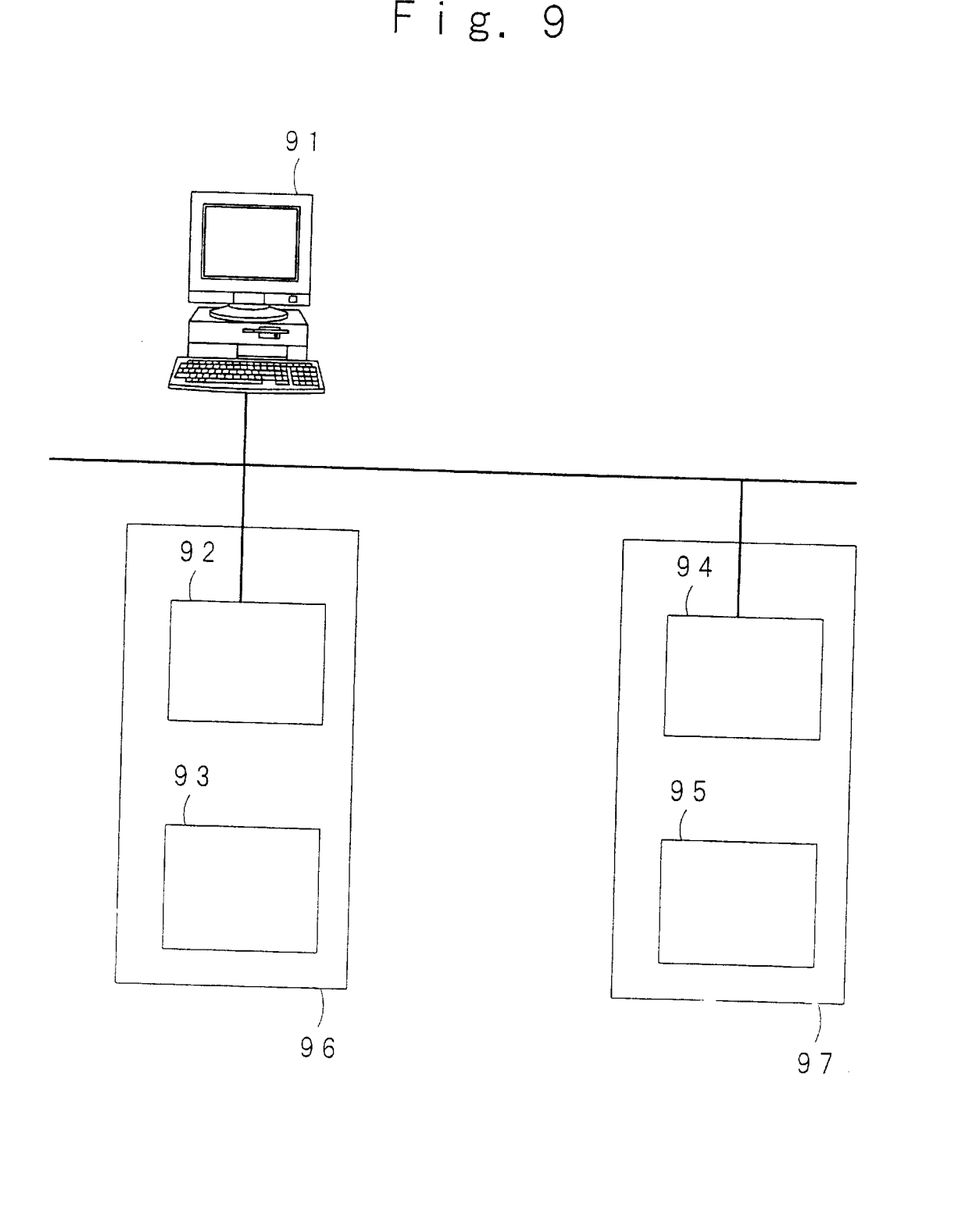
FIG. 9 is an explanatory drawing for explaining a twelfth embodiment.

A twelfth embodiment of the present invention will be described with reference to FIG. 9. FIG. 9 shows the structure of an industrial robot that realizes the present invention. In FIG. 9, reference numeral 91 designates a computer connected to a network, reference numeral 96 designates a first controller, reference numeral 92 designates a communications portion disposed in the first controller 96 for communicating with apparatuses connected to the network, reference numeral 93 designates a discrimination means connected to the network for outputting a sign by which apparatuses connected to the network are discriminated from each other, reference numeral 97 designates a second controller, reference numeral 94 designates a communications portion disposed in the second controller 97 for communicating with apparatuses connected to the network, and reference numeral 95 designates a discrimination means.

When the robot transmits and receives information to and from the network, the information is transmitted through the communications portion 92 or 94. At this time, the discrimination means 93 or 95 gives an apparatus-discriminating sign to each of the apparatuses connected to the network, and the information is transmitted and received to and from the network.

As described in the above embodiment, when the robot is connected to the network, information is transmitted and received to and from the computers or the other apparatuses connected to the network. In this case, there is a need to determine which apparatus the information running on the network is output from. The disposition of the discrimination means 93 and 95 in each robot makes the discrimination of information possible. Further, when each robot simultaneously transmits information to the network, the sign given by the discrimination means 93 and 95 determines priority, and information is transmitted and received to and from the network in the order of priority.

Accordingly, since the present invention realizes a robot system that includes the discrimination means 93 and 95 for outputting an apparatus-discriminating sign to each of the apparatuses connected to the network, the present invention has the effect of being able to discriminate pieces of information transmitted and received to and from the network and being able to determine priority according to the sign given by the discrimination means.

(Embodiment 13)

A thirteenth embodiment of the present invention will be described. As a first step of a robot control method, an operator operates a robot and indicates a movement pattern of the robot while using an operating means, and stores the movement pattern and a robot control program used to realize the movement pattern in a storage portion of the robot as an operating program. As a second step, a main arithmetic portion analyzes the operating program stored in the storage portion, and a robot-driving signal to drive the robot is output. As a third step, a signal from an apparatus connected to a network is input through a communications portion. As a fourth step, a signal from an apparatus connected to a robot sequencer is input. As a fifth step, the signal from the network that has been input in the third step and the signal from the sequencer that has been input in the fourth step are calculated. As a sixth step, the robot-driving signal is output on the basis of the result obtained in the fifth step, and the robot is driven. In order to continuously drive the robot, the second through sixth steps are repeated.

As mentioned above, the present invention realizes a robot control method that includes a step for storing an operating program of a robot, a step for analyzing a stored operating program, a step for outputting a robot-driving signal in accordance with an analyzed operating program, a step for inputting a signal from an apparatus connected to a network, a step for inputting a signal from an apparatus connected to a sequencer portion, a step for calculating the input signal, and a step for controlling an output of the robot-driving signal on the basis of the calculation. Thereby, the signal that has been previously transmitted from the network and the signal that has been input from the sequencer portion are calculated by the main arithmetic portion, and the movement of the robot and the movement of the external apparatus connected to the robot are determined from the calculation result. Thus, the present invention has the effect of being able to determine the movement of the external apparatus in accordance with the purpose in the production line.

(Embodiment 14)

A fourteenth embodiment of the present invention will be described. When the signal from the network that has been input in the third step and the signal from the sequencer that has been input in the fourth step are calculated in the fifth step of the thirteenth embodiment, a robot-driving output is turned on by a robot-moving command from the network only when a robot-movement-permission-input is given by the sequencer portion as an ON-signal even if the robot-moving command is transmitted from the network to the robot as an ON-signal in the case of, for example, an AND operation. Therefore, the present invention has the effect of being able to construct a safer system. In the case of an OR operation, the robot-driving output is turned off when either a robot-stopping command from the network or a robot-stopping input in the sequencer portion is turned on or when both of them are turned on. Therefore, the present invention has the effect of being able to construct a production line corresponding to actual use in the factory.

Accordingly, since the present invention realizes a robot control method in which an AND operation and an OR operation are performed, the present invention has the effect of being able to construct a safer system and the effect of being able to construct a production line corresponding to actual use in the factory.

(Embodiment 15)

A fifteenth embodiment of the present invention will be described. As a first step of a robot control method, an operator operates a robot and indicates a movement pattern of the robot by use of an operating means, and stores the movement pattern and a robot control program used to realize the movement pattern in a storage portion of the robot as an operating program. As a second step, a main arithmetic portion analyzes the operating program stored in the storage portion, and a robot-driving signal to drive the robot is output. As a third step, a message signal from an apparatus connected to a network is input through a communications portion. As a fourth step, a message signal from an apparatus connected to a robot sequencer is input. As a fifth step, the message signal from the network that has been input in the third step and the message signal from the sequencer that has been input in the fourth step are calculated. As a sixth step, the robot-driving signal is output on the basis of the result obtained in the fifth step, and the robot is driven. In order to continuously drive the robot, the second through sixth steps are repeated.

As mentioned above, the present invention realizes a robot control method that includes a step for storing an operating program of a robot, a step for analyzing a stored operating program, a step for outputting a robot-driving signal in accordance with an analyzed operating program, a step for inputting a message signal from an apparatus connected to a network, a step for inputting a message signal from an apparatus connected to a sequencer portion, a step for calculating the input message signal, and a step for controlling an output of the driving signal on the basis of the calculation. Thereby, the message signal that has been previously transmitted from the network and the message signal that has been input from the sequencer portion are calculated by the main arithmetic portion, and the movement of the robot and the movement of the external apparatus connected to the robot are determined from the calculation result. Thus, the present invention has the effect of being able to determine the movement of the external apparatus in accordance with the purpose in the production line.

(Embodiment 16)

A sixteenth embodiment of the present invention will be described. As a first step of a robot control method, an operator operates a robot and indicates a movement pattern of the robot by use of an operating means, and stores the movement pattern and a robot control program used to realize the movement pattern in a storage portion of the robot as an operating program. As a second step, a main arithmetic portion analyzes the operating program stored in the storage portion, and a robot-driving signal to drive the robot is output. As a third step, the movement state of the robot during a past fixed time is stored in a history storage portion. As a fourth step, the history information stored in the third step is output to the network if the robot stops. In order to continuously drive the robot, the second through fourth steps are repeated.

Accordingly, the present invention realizes a robot control method that includes a step for storing an operating program of a robot, a step for analyzing a stored operating program, a step for outputting a robot-driving signal in accordance with an analyzed operating program, a step for storing the history of a state of the robot, and a step for outputting the stored history information to the network when a stop factor of the robot occurs. Therefore, the present invention has the effect of being able to restore the production line into a correct working condition while a management apparatus connected to the network uses the history information because the history of the state of the robot is output to the network even when the robot installed in the production line stops by some factor.

What is claimed is:

1. A robot comprising a storage portion in which an operating program for the robot is stored, a main arithmetic portion for analyzing the operating program stored in the storage portion, a sequencer portion from which a signal from the main arithmetic portion is output, a driving portion for driving the robot to which a signal from the main arithmetic portion is input, and a communications portion for communicating with apparatuses connected to a network, wherein a signal input from an apparatus connected to the sequencer portion to the sequencer portion and a signal input to the communications portion are input to the main arithmetic portion, and a calculation is performed by the main arithmetic portion, and, based on the calculation, a signal is output from the main arithmetic portion to the sequencer portion or to the driving portion.

2. The robot of claim 1, wherein the main arithmetic portion performs a calculation including "AND" and "OR" on the basis of a signal input from the apparatus connected to the sequencer portion to the sequencer portion and a signal input to the communications portion.

3. A robot system in which the robot of claim 1 and computers that are apparatuses connected to the network are used, and communications are performed between at least two computers for all of or part of the operating program of the robot, and the operating program of the robot is stored in the storage portion through the communications portion from one of the computers.

4. The robot system of claim 3, further comprising a discrimination means form which an apparatus-discriminating sign is output to each apparatus connected to the network.

5. The robot system of claim 3, wherein the two computers have encrypting means for encrypting information to be communicated and decrypting means for restoring encrypted information into an original condition.

6. A robot system in which a plurality of the robots as recited in claim 1, an operating means connected to at least one of the robots, a communications portion from which a signal for driving the robot connected to the operating means is output, and a computer used as the apparatus connected to the network are used, and a signal is input from the computer to a second robot different from a robot that has output the robot-driving signal through the communications portion, and the second robot is driven according to information operated by the operating means.

7. The robot system of claim 6, further comprising a discrimination means from which an apparatus-discriminating sign is output to each apparatus connected to the network.

8. A robot comprising a storage portion in which an operating program for the robot is stored, a main arithmetic portion for analyzing the operating program stored in the storage portion, a sequencer portion from which a signal from the main arithmetic portion is output, a driving portion for driving the robot to which the signal from the main arithmetic portion is input, and a communications portion for communicating with apparatuses connected to a network, wherein a message signal input from an apparatus connected to the sequencer portion to the sequencer portion and a message signal input to the communications portion are input to the main arithmetic portion, and a calculation is performed by the main arithmetic portion, and, based on the calculation, a signal output from the main arithmetic portion to the sequencer portion or a signal output to the driving portion is controlled.

9. A robot comprising a storage portion in which an operating program for the robot is stored, a main arithmetic portion for analyzing the operating program stored in the storage portion, a sequencer portion to which a signal from the main arithmetic portion is input, a driving portion for driving the robot to which the signal from the main arithmetic portion is input, a communications portion for communicating with apparatuses connected to a network, and a communications method storage portion in which information about a communications method of the network is stored, wherein communications are performed on the basis of the information stored in the communications method storage portion even in a network different in the communications method.

10. The robot of any one of claim 1 through claim 9, further comprising a plurality of input/output terminals and a memory table that stores allotment of input/output terminals used for an input/output part of the sequencer portion and input/output terminals used for an input/output part of the communications portion.

11. A robot system in which the robot of claim 10, and computers that are apparatuses connected to the network are used, and communications are performed between at least two computers for all of or part of the operating program of the robot, and the operating program of the robot is stored in the storage portion through the communications portion from one of the computers.

12. The robot system of claim 11, wherein the two computers have encrypting means for encrypting information to be communicated and decrypting means for restoring encrypted information into an original condition.

13. A robot system in which a plurality of the robots as recited in claim 10, an operating means connected to at least one of the robots, a communications portion from which a signal for driving the robot connected to the operating means is output, and a computer used as the apparatus connected to the network are used, and a signal is input from the computer to a second robot different from a robot that has output the robot-driving signal through the communications portion, and the second robot is driven according to information operated by the operating means.

14. A robot comprising a storage portion in which an operating program for the robot is stored, a main arithmetic portion for analyzing the operating program stored in the storage portion, a sequencer portion to which a signal from the main arithmetic portion is input, a driving portion for driving the robot to which the signal from the main arithmetic portion is input, a communications portion for communicating with apparatuses connected to a network, and a history storage portion in which a history of a state of the robot is stored, wherein information about the history storage portion is output from the communications portion to the network when a stop factor of the robot occurs.

15. The robot of claim 14, further comprising a plurality of input/output terminals and a memory table that stores allotment of input/output terminals used for an input/output part of the sequencer portion and input/output terminals used for an input/output part of the communications portion.

16. A robot system in which the robot of claim 14 or claim 15 and computers that are apparatuses connected to the network are used, and communications are performed between at least two computers regarding information output from the history storage portion.

17. The robot system of claim 16, wherein the two computers have encrypting means for encrypting information to be communicated and decrypting means for restoring encrypted information into an original condition.

18. The robot system of claim 17, further comprising a discrimination means from which an apparatus-discriminating sign is output to each apparatus connected to the network.

19. A robot system in which the robot of claim 16 and computers that are apparatuses connected to the network are used, and communications are performed between at least two computers for all of or part of the operating program of the robot, and the operating program of the robot is stored in the storage portion through the communications portion from one of the computers.

20. The robot system of claim 19, wherein the two computers have encrypting means for encrypting information to be communicated and decrypting means for restoring encrypted information into an original condition.

21. A robot system in which a plurality of the robots as recited in claim 16, an operating means connected to at least one of the robots, a communications portion from which a signal for driving the robot connected to the operating means is output, and a computer used as the apparatus connected to the network are used, and a signal is input from the computer to a second robot different from a robot that has output the robot-driving signal through the communications portion, and the second robot is driven according to information operated by the operating means.

22. A robot control method comprising a step for storing an operating program of a robot, a step for analyzing a stored operating program, a step for outputting a robot-driving signal in accordance with an analyzed operating program, a step for inputting a signal from an apparatus connected to a network, a step for inputting a signal from an apparatus connected to a sequencer portion, a step for calculating an input signal, and a step for controlling an output of the driving signal on the basis of a calculation.

23. The robot control method of claim 22, wherein a calculation that includes "AND" and "OR" is performed when the input signal is calculated.

24. A robot control method comprising a step for storing an operating program of a robot, a step for analyzing a stored operating program, a step for outputting a robot-driving signal in accordance with an analyzed operating program, a step for inputting a message signal from an apparatus connected to a network, a step for inputting a message signal from an apparatus connected to a sequencer portion, a step for calculating an input message signal, and a step for controlling an output of a signal to be output to the sequencer portion or an output of the driving signal on the basis of a calculation.

25. A robot control method comprising a step for storing an operating program of a robot, a step for analyzing a stored operating program, a step for outputting a robot-driving signal in accordance with an analyzed operating program, a step for storing a history of a state of the robot, and a step for outputting a piece of stored history information to the network when a stop factor of the robot occurs.

* * * * *